(12) United States Patent
Burky et al.

(10) Patent No.: US 6,275,918 B1
(45) Date of Patent: Aug. 14, 2001

(54) OBTAINING LOAD TARGET OPERAND PRE-FETCH ADDRESS FROM HISTORY TABLE INFORMATION UPON INCREMENTED NUMBER OF ACCESS INDICATOR THRESHOLD

(75) Inventors: William Elton Burky; Peter Steven Lenk; Dung Quoc Nguyen, all of Austin; David Andrew Schroter, Round Rock; Shih-Hsiung Stephen Tung; Michael Thomas Vaden, both of Austin, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/268,307

(22) Filed: Mar. 16, 1999

(51) Int. Cl.[7] ...................................................... G06F 9/34

(52) U.S. Cl. ........................ 711/213; 711/137; 712/207; 712/225

(58) Field of Search ................................... 712/207, 225; 711/137, 213

(56) References Cited

U.S. PATENT DOCUMENTS

| | | | |
|---|---|---|---|
| 4,764,861 | 8/1988 | Shibuya ................................. | 712/207 |
| 4,984,154 | 1/1991 | Hanatani et al. ..................... | 712/240 |
| 5,265,213 | 11/1993 | Weiser et al. ......................... | 712/240 |
| 5,317,702 | 5/1994 | Morisada ............................... | 712/207 |
| 5,377,336 | * 12/1994 | Eickemeyer et al. ................ | 712/207 |
| 5,394,530 | 2/1995 | Kitta ...................................... | 712/240 |
| 5,404,467 | 4/1995 | Saba et al. ............................ | 712/207 |
| 5,434,985 | 7/1995 | Emma et al. ......................... | 712/240 |
| 5,623,614 | 4/1997 | Van Dyke et al. ................... | 712/240 |
| 5,790,823 | * 8/1998 | Puzak et al. .......................... | 712/207 |
| 5,822,788 | * 10/1998 | Kahn et al. ........................... | 711/213 |

* cited by examiner

Primary Examiner—Kenneth S. Kim
(74) Attorney, Agent, or Firm—Anthony V. S. England; Bracewell & Patterson, L.L.P.

(57) ABSTRACT

A method and system for improving pre-fetch accuracy in a data processing system utilizing a pre-fetch history table is disclosed. The method compares a portion of an instruction address to an address located as an entry in a pre-fetch history table based on the status of a validity bit contained in the entry. If the validity bit is set and the addresses match, an indicator field within the entry is checked to see if it is equal to or greater than a threshold level. When the indicator field is greater than the threshold level, a target operand address is pre-fetched based on stride and direction.

17 Claims, 4 Drawing Sheets

OBTAINING LOAD TARGET OPERAND PRE-FETCH ADDRESS FROM HISTORY TABLE INFORMATION UPON INCREMENTED NUMBER OF ACCESS INDICATOR THRESHOLD

BACKGROUND OF THE INVENTION

1. Technical Field

The present invention relates in general to data processing or information handling systems and, in particular, to a method and system for fetching data from memory. Still more particularly, the present invention relates to a method and system for pre-fetching data from memory based upon a pre-fetch history table.

2. Description of the Related Art

As processor clock frequencies have continued to increase, thereby permitting increased instruction throughput, memory latency has become a principal impediment to improved processor performance. Although instructions are commonly speculatively fetched from memory in order to ameliorate the effects of instruction access latency, in a conventional processor data is fetched from memory only after a load instruction has been executed to determine the address of the data to be fetched (i.e., only demand fetching is used).

The present invention includes a recognition that in order to reduce data access latency, it is desirable to intelligently pre-fetch data from memory. Modern microprocessors employ pre-fetching in order to reduce the latency involved in cache misses. An improved pre-fetching mechanism is needed to more accurately determine that a pre-fetch is likely to be useful as well as the best target to pre-fetch. The subject invention herein solves this problem in a new and unique manner that has not been part of the art previously.

SUMMARY OF THE INVENTION

It is therefore one object of the present invention to provide an improved method and system for data processing.

It is another object of the present invention to provide an improved method and system for fetching data from memory.

It is yet another object of the present invention to provide a processor and method for pre-fetching data from memory based upon a pre-fetch history table.

The foregoing objects are achieved as is now described. A method and system for improving pre-fetch accuracy in a data processing system or information handling system utilizing a pre-fetch history table compares a portion of an instruction address to an address located as an entry in a pre-fetch history table based on the status of a validity bit contained in the entry. If the validity bit is set and the addresses match, an indicator field within the entry is checked to see if it is equal to or greater than a threshold level. When the indicator field is greater than the threshold level, a target operand address is pre-fetched based on stride and direction.

The above as well as additional objects, features, and advantages of the present invention will become apparent in the following detailed written description.

DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

Figure 1:
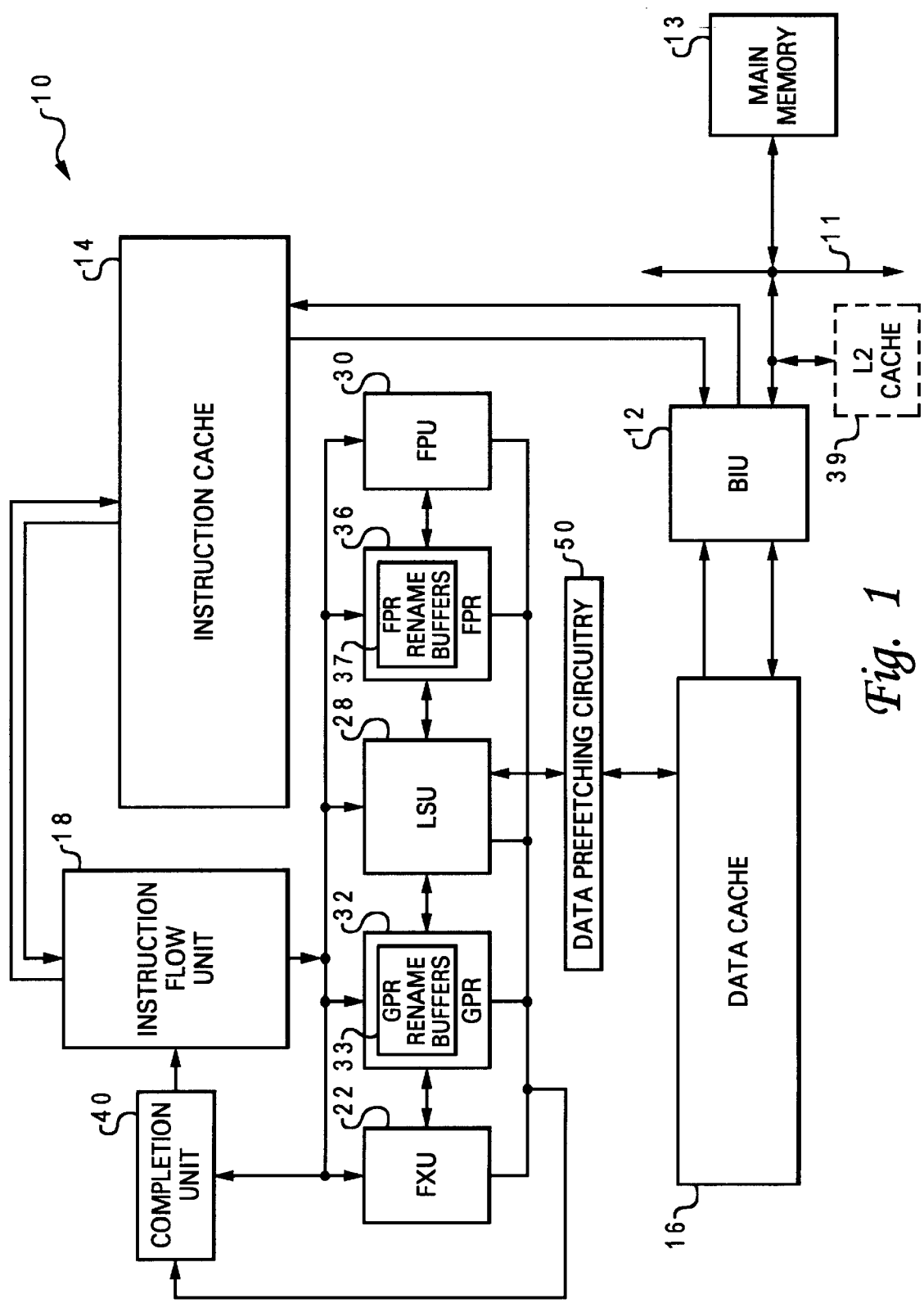
FIG. 1 depicts an illustrative embodiment of a data processing system in which the present invention may advantageously be utilized.

With reference now to the figures and in particular with reference to FIG. 1, there is depicted a block diagram of an illustrative embodiment of a processor, indicated generally at 10, for processing data and instructions in accordance with the invention recited in the appended claims. In the depicted illustrative embodiment, processor 10 comprises a single integrated circuit superscalar microprocessor. Accordingly, as discussed further below, processor 10 includes various execution units, registers, buffers, memories, and other functional units, which are all formed by integrated circuitry. Processor 10 preferably comprises one of the PowerPC™ line of microprocessors available from IBM Microelectronics, which operates according to reduced instruction set computing (RISC) techniques; however, those skilled in the art will appreciate from the following description that the present invention may alternatively be implemented in other suitable processors or memory devices.

As illustrated in FIG. 1, processor 10 is coupled to a processor bus 11 via a bus interface unit (BIU) 12 within processor 10. BIU 12 controls the transfer of data and instructions between processor 10 and devices coupled to processor 10, such as optional level two (L2) cache 39 and main memory 13. Processor 10, optional L2 cache 39, processor bus 11, and the devices coupled to processor bus 11 together form a data processing system.

BIU 12 is connected to instruction cache 14 and data cache 16 within processor 10. Upper level caches, such as instruction cache 14 and data cache 16, enable processor 10 to achieve relatively fast access time to a subset of data or instructions previously transferred from L2 cache 39 or main memory 13 to the caches, thus improving the speed of operation of the data processing system. Instruction cache 14 is further coupled to instruction flow unit 18, which fetches instructions from instruction cache 14. Branch instructions fetched from instruction cache 14 are processed by branch processing circuitry internal to instruction flow unit 18; sequential instructions, on the other hand, are temporarily buffered within instruction flow unit 18 until they are dispatched to the sequential execution circuitry of processor 10.

In the depicted illustrative embodiment, the sequential execution circuitry of processor 10 includes fixed-point unit (FXU) 22, load-store unit (LSU) 28, and floating-point unit (FPU) 30. Each of execution units 22, 28, and 30 typically executes one or more instructions of a particular type of sequential instructions during each processor cycle. For example, FXU 22 performs integer mathematical and logical operations such as addition, subtraction, ANDing, Oring, and XORing, utilizing integer source operands received from specified general purpose registers (GPRs) 32 or GPR rename buffers 33. Following the execution of an instruction, FXU 22 outputs the resulting data, if any, to GPR rename buffers 33, which provide temporary storage for the result data until the instruction is completed under the direction of completion unit 40 by transferring the result data from GPR rename buffers 33 to one or more of GPRs 32. FPU 30, on the other hand, typically performs arithmetic and logical operations, such as multiplication and division, on single and double-precision floating-point source operands received from floating-point registers (FPRs) 36 or FPR rename buffers 37. FPU 30 outputs data resulting from the execution of floating-point instructions to selected FPR rename buffers 37, which temporarily store the result data until the instructions are completed under the direction of completion unit 40 by transferring the result data from FPR rename buffers 37 to selected FPRs 36.

As its name implies, LSU 28 typically executes floating-point and fixed-point instructions that either load data from memory (i.e., either data cache 16, L2 cache 39, or main memory 13) into selected GPRs 32 or FPRs 36 or that store data from a selected one of GPRs 32, GPR rename buffers 33, FPRs 36, or FPR rename buffers 37 to memory. As discussed further below with respect to FIGS. 2 and 3, load addresses computed by LSU 28 are examined by data prefetching circuitry 50 in order to determine whether a repeated stride exists. If so, a load address can be generated by data prefetching circuitry 50 based on a pre-fetch history table, and the load address can be transmitted to memory to initiate data prefetching.

Processor 10 preferably employs both pipelining and out-of-order execution of instructions to further improve the performance of its superscalar architecture. Accordingly, instructions can be executed by FXU 22, LSU 28, and FPU 30 in any order as long as data dependencies are observed. In addition, instructions are processed by processor 10 at a sequence of pipeline stages, including, for example, fetch, decode/dispatch, execute, finish, and completion.

Figure 2:
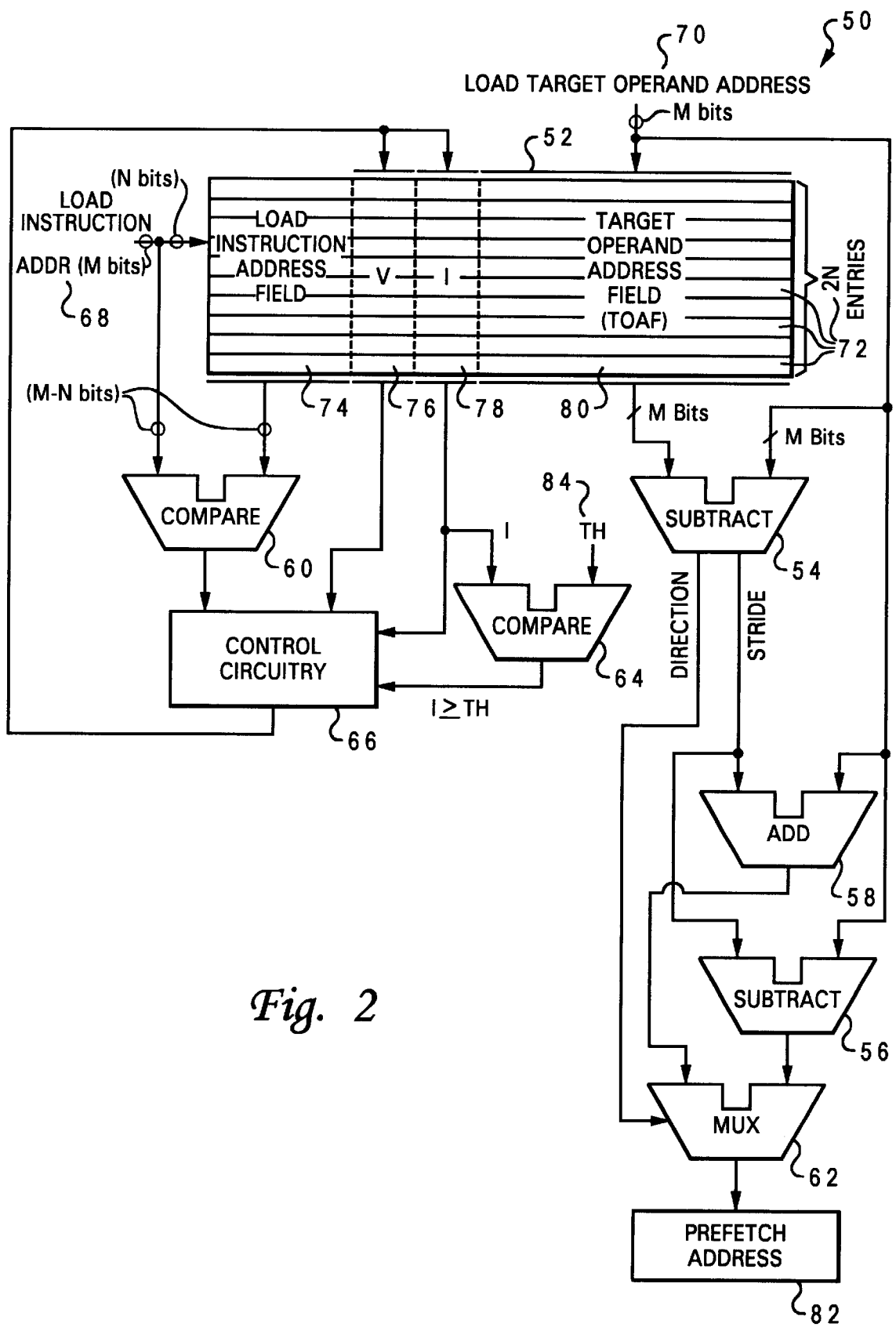
FIG. 2 is a block diagram of an illustrative embodiment of data pre-fetch circuitry in accordance with the present invention.

Referring now to FIG. 2, there is illustrated a more detailed block diagram of the data pre-fetching within processor 10 of FIG. 1. Data pre-fetching circuitry, indicated generally at reference numeral 50, includes a pre-fetch history table 52, subtractors 54 and 56, adder 58, MUX 62, control circuitry 66 and comparators 60 and 64. As depicted, each load address or load target operand address 70 resulting from the execution of a load instruction 68 by LSU 28 is passed to the pre-fetch history table 52. The format of the pre-fetch history table 52 consists of $2^N$ entries wherein each entry is divided as follows; a portion of a load instruction address which is "M"—"N" bits long 74, a validity "V" bit 76, a field indicator "I" 78 and a target operand address field 80 which is "M" bits long. By way of example, but not of limitation, if the load target operand 80 is 32 bits long and N equals 10, then the load instruction address field 74 is 32-10 or 22 bits long, the validity bit 76 is one bit, the indicator field 78 is 5 bits giving an entry 72 length of 60 bits with 1024 entries.

Figure 3A:
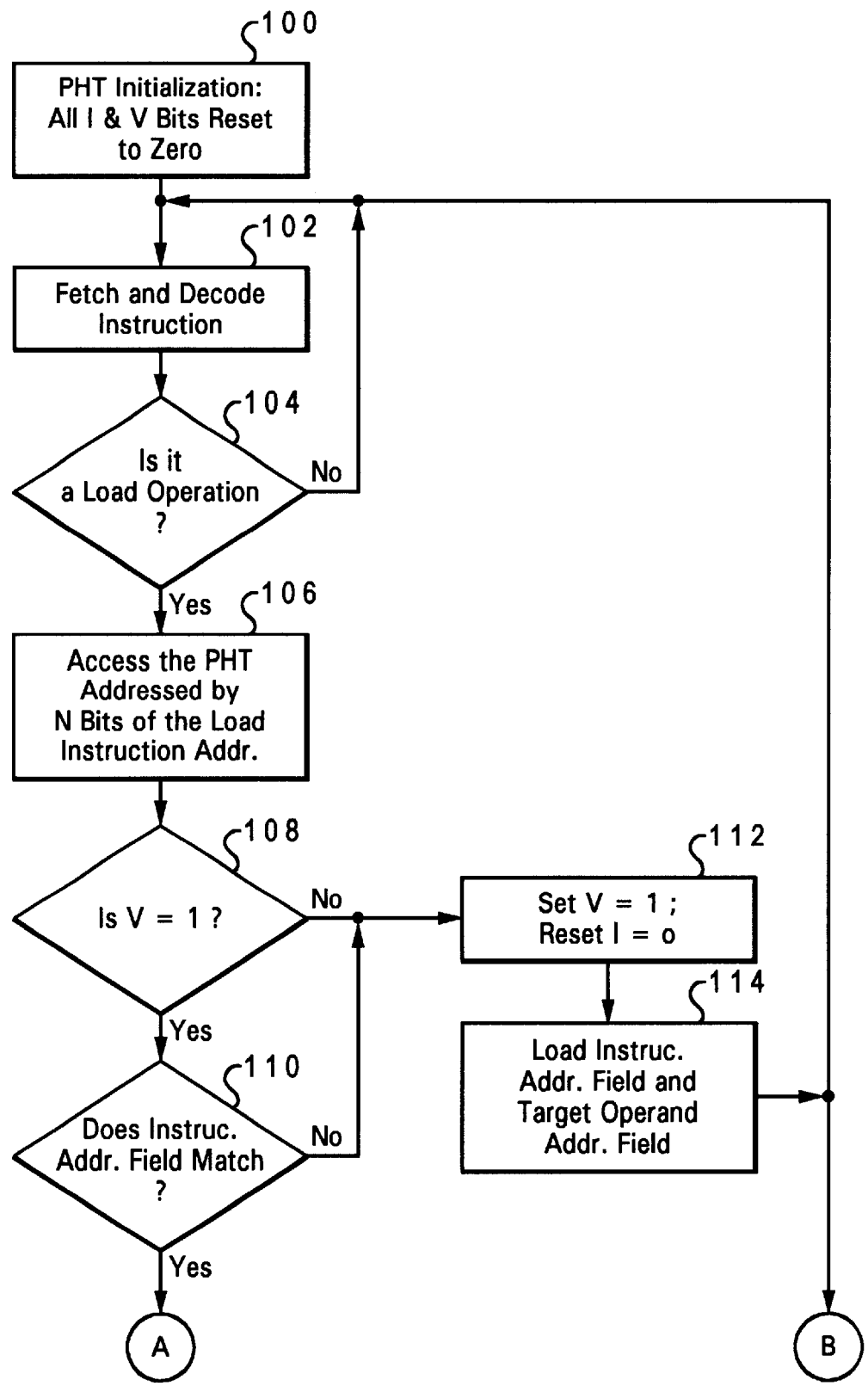
FIGS. 3A and 3B are logical flowcharts illustrating with an exemplary method for pre-fetching data in accordance with the present invention.
Figure 3B:
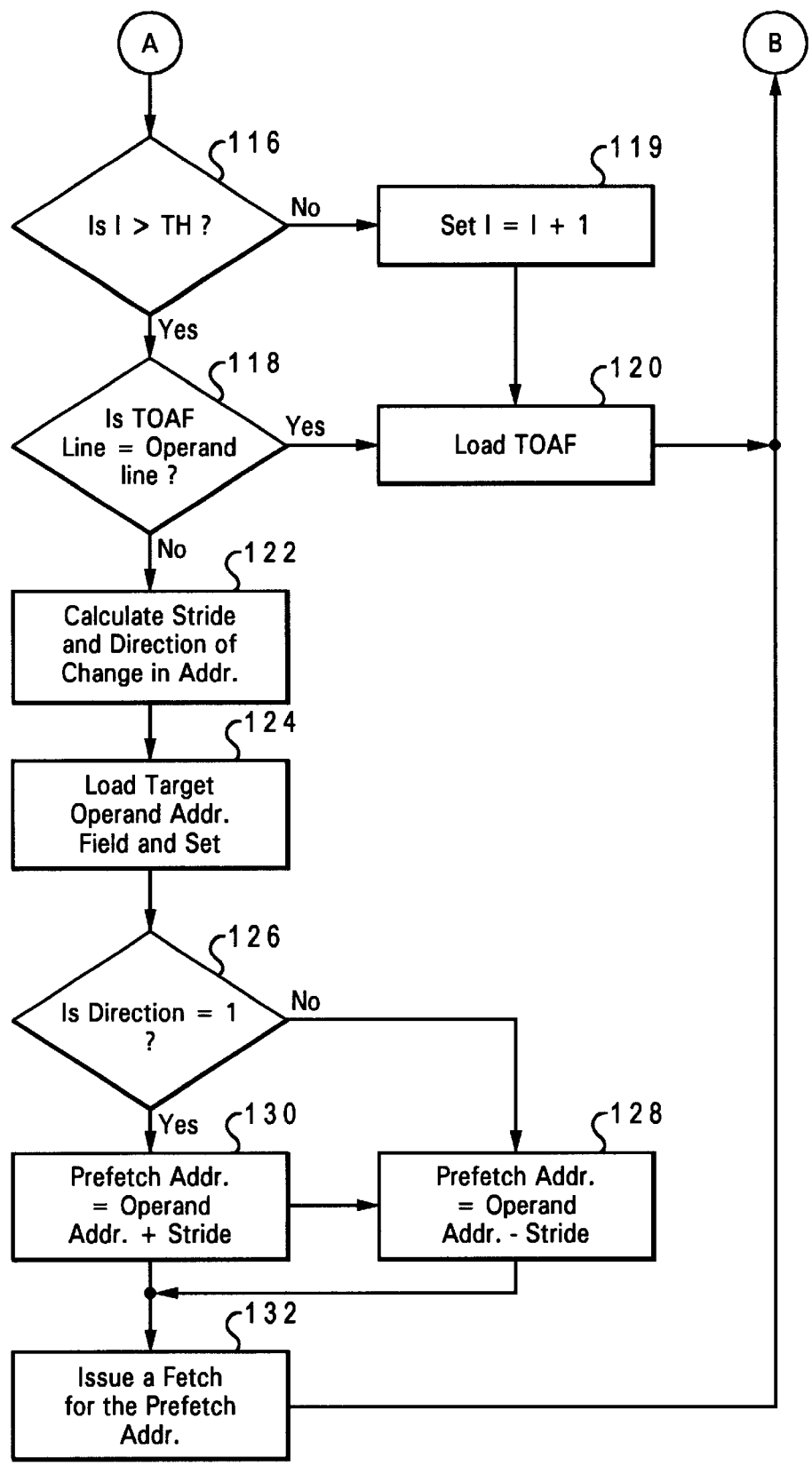

Referring to FIGS. 3A and 3B, there is shown a high-level flowchart for pre-fetching load addresses using the pre-fetch circuitry 50 shown in FIG. 2. As shown in step 100, when the power-on reset mode of the computer is initiated, the pre-fetch history table 52 (PHT) is initialized by setting the I 78 and V 76 bits to zero. Next an instruction is fetched and decoded in step 102 wherein it is determined if the instruction is a load or a store. By way of example, the load instruction will be used throughout although it should be understood that the method of the present invention also applies equally with respect to store instructions. If the instruction is neither a load nor a store instruction, the process continues back to step 102 and the next instruction is fetched. If a load operation is encountered in step 104, process proceeds to step 106 wherein the entry 72 of the pre-fetch history table 52 is accessed at the location address corresponding to the N portion of the load instruction address 68. The validity bit 76 is then checked in step 108 to see if it is a one indicating that the address has a pre-fetch history. If the validity bit 76 is a zero, no pre-fetch history exists, the validity bit 76 is then set to one, the indicator field is cleared and the instruction address field 74 and target operand field 80 are loaded into the pre-fetch history table 52, as illustrated in steps 112 and 114. The process then repeats for the next instruction by returning to step 102. As shown in FIG. 2, V and I are set by control circuitry 66.

If however the validity bit 76 is a one, then pre-fetch history exists for the load instruction and the M-N portion of the load instruction 68 is compared to the load instruction address field 74 in the pre-fetch history table 52 by using comparator 60, as shown in step 110. If the addresses do not match, then the process proceeds to steps 112 and 114 as explained above. If the addresses do match, then the indicator field 78 is compared to a threshold value to determine if it is greater or equal to the threshold value 84 through comparator 64, as shown in step 116. By way of example but not of limitation, since the indicator field is 5 bits long, a typical threshold value 84 may be 32. If the indicator field 78 is less than the threshold value 84, the indicator field 78 is incremented by one in step 119 using control circuitry 66 and the target operand address is loaded in the pre-fetch history 52, as shown in step 120. The process then repeats for the next instruction by returning to step 102. If the indicator field 78 is greater than or equal to the threshold value 84, the target operand address field 80 is compared against the target operand address 70 from the operand line to see if they are the same. If the addresses are the same, the target operand address 70 is loaded in the pre-fetch history 52, as shown in step 120. The process then repeats for the next instruction by returning to step 102. It should be noted, that within control circuitry 66 (although not shown) is a saturation counter which prevents the indicator field 78 from rolling over to a value of zero If however, the target operand address field 80 in the pre-fetch history table 52 is not the same as the target operand address 70, the stride and change in direction is calculated as shown in step 122. The direction and stride are determined by subtracting the previous contents of the target operand address field 80 from the target operand address 70 on the operand line using subtractor 54, as shown in FIG. 2. The direction indicates whether the addresses are increasing or decreasing as the pre-fetches are being performed. The stride indicates the number of cache lines between the target operand address field 80 and the current target operand address 70. Next, the target operand address field is loaded in the pre-fetch history table 52 in step 124. As shown in step 126, if the direction is not equal to one, it is decreasing and the stride is subtracted using subtractor 56 in step 128 from the target operand address 70 to determine the pre-fetch address. If the direction is increasing, then step 130 is performed and the stride is added by using adder 58 to the target operand address 70 to determine the pre-fetch address. These results and the direction is feed into MUX 62, as shown in FIG. 2 wherein a pre-fetch is issued in step 132 for the resulting pre-fetch address 82. The method of the present invention, then proceeds to step 102 and the process begins again by fetching the next instruction.

It is also important to note that although the present invention has been described in the context of providing pre-fetching utilizing a pre-fetch history table, those skilled in the art will appreciate that the mechanisms of the present invention are capable of being distributed as a program product in a variety of forms to any type of information handling system, and that the present invention applies equally regardless of the particular type of signal bearing media utilized to actually carry out the distribution. Examples of signal bearing media include, without limitation, recordable type media such as floppy disk or CD ROMs and transmission type media such as analog or digital communications links.

Although not shown, it may be envisioned that the direction and stride information may be added into the pre-fetch history table. Thus once the stride and direction were calculated for a particular entry it could be accessed from the pre-fetch history table as opposed to recalculating it each time.

While the invention has been particularly shown and described with reference to a preferred embodiment, it will be understood by those skilled in the art that various changes in form and detail may be made therein without departing from the spirit and scope of the invention. For example, although data pre-fetching circuitry 50 is illustrated in FIG. 2 as being distinct from LSU 28 and cache controller 90, it should be understood that in alternative embodiments data pre-fetching circuitry 50 can be incorporated within LSU 28 or within cache controller 90. Moreover, although the present invention has been described with respect to an illustrative embodiment in which a processor pre-fetches data from a lower level memory, it should be understood that data pre-fetching circuitry in accordance with the present invention is equally applicable to the pre-fetching of data by a lower level memory, such as L2 cache 39 pre-fetching data from main memory 13.

What is claimed is:

1. A method for improving pre-fetch accuracy in a data processing system utilizing a pre-fetch history table, said method comprising the steps of:

providing a first load instruction address;

accessing an entry within a pre-fetch history table by comparing a portion of said first load instruction address with a second address located as an entry in said pre-fetch history table, wherein said pre-fetch history table contains a target operand address associated with said first load instruction address;

determining whether or not pre-fetch history is contained in said entry in accordance with the status of a validity bit;

responsive to a determination that pre-fetch history is contained in said entry, incrementing an indicator field within said entry, wherein said indicator field maintains a count of the number of accesses to said entry; and obtaining a pre-fetch target operand address for a next load instruction in response to said count exceeding a threshold value, wherein said pre-fetch target operand address is determined in accordance with said associated target operand address within said pre-fetch history table.

2. The method for improving pre-fetch accuracy in a data processing system according to claim 1, further comprising the step of:

defining said first load instruction address and said associated target operand address as having "M" bits wherein said portion of said first load instruction address is "N" bits and the size of said pre-fetch history table is $2^N$.

3. The method for improving pre-fetch accuracy in a data processing system according to claim 1, further comprising the step of:

providing a validity bit in said entry for determining pre-fetch history.

4. The method for improving pre-fetch accuracy in a data processing system according to claim 1, further comprising the step of:

calculating said target operand address based on a stride and direction from said associated target operand address within said pre-fetch history table.

5. The method for improving pre-fetch accuracy in a data processing system according to claim 1, further comprising the step of:

providing said associated target operand address in said entry.

6. The method for improving pre-fetch accuracy in a data processing system according to claim 1, further comprising the step of:

comparing said indicator field against a threshold value for determining when to obtain said pre-fetch target operand address.

7. An information handling system, comprising:

means for providing a first load instruction address;

means for accessing an entry within a pre-fetch history table by comparing a portion of said first load instruction address with a second address located as an entry in said pre-fetch history table, wherein said pre-fetch history table contains a target operand address associated with said first load instruction address;

means for determining whether or not pre-fetch history is contained in said entry in accordance with the status of a validity bit;

means responsive to a determination that pre-fetch history is contained in said entry for incrementing an indicator field within said entry, wherein said indicator field maintains a count of the number of accesses to said entry; and means for obtaining a target operand address for a next load instruction in response to said count exceeding a threshold value, wherein said pre-fetch target operand address is determined in accordance with said associated target operand address within said pre-fetch history table.

8. The information handling system according to claim 7, further comprising:

means for comparing said indicator field against a threshold value for determining when to obtain said pre-fetch target operand address.

9. The information handling system according to claim 7, further comprising:

means for defining said first load instruction address and said associated target operand address as having "M" bits wherein said portion of said first load instruction address is "N" bits and the size of said pre-fetch history table is $2^N$.

10. The information handling system according to claim 7, further comprising:

means for providing a validity bit in said entry for determining pre-fetch history.

11. The information handling system according to claim 7, further comprising:

means for calculating said target operand address based on a stride and direction from said associated target operand address within said pre-fetch history table.

12. The information handling system according to claim 7, further comprising:

means for providing said associated target operand address in said entry.

13. A computer product residing on a computer usable medium for improving pre-fetch accuracy in a data processing system utilizing a pre-fetch history table, comprising:

instruction means for providing a first load instruction address;

instruction means for accessing an entry within a pre-fetch history table by comparing a portion of said first load instruction address with a second address located as an entry in said pre-fetch history table, wherein said pre-fetch history table contains a target operand address associated with said first load instruction address;

determining whether or not pre-fetch history is contained in said entry in accordance with the status of a validity bit;

instruction means responsive to a determination that pre-fetch history is contained in said entry for incrementing an indicator field within said entry, wherein said indicator field maintains a count of the number of accesses to said entry; and instruction means for obtaining a target operand address for a next load instruction in response to said count exceeding a threshold value, wherein said pre-fetch target operand address is determined in accordance with said associated target operand address within said pre-fetch history table.

14. The computer program product according to claim 13, further comprising:

instruction means for providing a validity bit in said entry for determining pre-fetch history.

15. The computer program product according to claim 13, further comprising:

instruction means for calculating said target operand address based on a stride and direction from said associated target operand address within said pre-fetch history table.

16. The computer program product according to claim 13, further comprising:

instruction means for providing said associated target operand address in said entry.

17. The computer program product according to claim 13, further comprising:

instruction means for comparing said indicator field against a threshold value for determining when to obtain said pre-fetch target operand address.

* * * * *